(12) United States Patent
Takata (10) Patent No.: US 8,305,519 B2
(45) Date of Patent: Nov. 6, 2012

(54) LIQUID CRYSTAL DISPLAY DEVICE AND TELEVISION RECEIVING APPARATUS

(75) Inventor: Yoshiki Takata, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 499 days.

(21) Appl. No.: 12/600,347

(22) PCT Filed: Dec. 13, 2007

(86) PCT No.: PCT/JP2007/073995
§ 371 (c)(1),
(2), (4) Date: Nov. 16, 2009

(87) PCT Pub. No.: WO2008/146425
PCT Pub. Date: Dec. 4, 2008

(65) Prior Publication Data
US 2010/0165242 A1  Jul. 1, 2010

(30) Foreign Application Priority Data
May 29, 2007  (JP) ................................. 2007-142646

(51) Int. Cl.
*G02F 1/1335* (2006.01)
(52) U.S. Cl. ............... 349/62; 349/57; 349/96; 349/117
(58) Field of Classification Search ............... 349/57, 349/65, 117, 96, 95, 56, 62; 362/97.2, 339, 362/611
See application file for complete search history.

(56) References Cited

U.S. PATENT DOCUMENTS

| 5,587,816 | A  | * | 12/1996 | Gunjima et al. | ................ 349/62 |
| 2006/0007375 | A1 | * | 1/2006 | Nagashima et al. | .......... 349/117 |
| 2006/0209502 | A1 |   | 9/2006 | Sakata | |

FOREIGN PATENT DOCUMENTS

| CN | 1567045 A | 1/2005 |
| JP | 08-022000 | 1/1996 |
| JP | 09-061818 | 3/1997 |
| JP | 11-003608 | 1/1999 |
| JP | 2006-039056 | 2/2006 |

OTHER PUBLICATIONS

International Search Report for PCT/JP2007/073995, mailed Jan. 15, 2008.
Chinese Office Action and English translation thereof mailed Feb. 24, 2011 in Chinese application 200780052968.7.

* cited by examiner

*Primary Examiner* — Thoi Duong
(74) *Attorney, Agent, or Firm* — Nixon & Vanderhye P.C.

(57) ABSTRACT

Provided are a liquid crystal display device and television receiving apparatus having further improved use efficiency of light emitted from a light source while suppressing increase in costs. A liquid crystal display device 1 of the invention includes a liquid crystal display panel (40), two polarizing layers (first polarizing layer (50), second polarizing layer (52)) disposed so that the two polarizing layers sandwich the liquid crystal display panel, and a backlight device (10) (light source). Between the backlight device (10) and the first polarizing layer (50) (rear polarizing layer) that is one of the two polarizing layers disposed closer to the backlight device (10), an optical sheet assembly (20) is provided, which optical sheet assembly includes a lens sheet (22) for converging light emitted from the backlight. Furthermore, the first polarizing layer (50) and the optical sheet assembly (20) sandwich a $\lambda/2$ sheet (30) ($\lambda/2$ layer).

13 Claims, 9 Drawing Sheets

LIQUID CRYSTAL DISPLAY DEVICE AND TELEVISION RECEIVING APPARATUS

This application is the U.S. national phase of International Application No. PCT/JP2007/073995, filed 13 Dec. 2007, which designated the U.S. and claims priority to Japanese Patent Application No. 2007-142646, filed 29 May 2007, the entire contents of each of which are hereby incorporated by reference.

TECHNICAL FIELD

The present invention relates to a liquid crystal display device with improved use efficiency of light emitted from a light source, and a television receiving apparatus.

BACKGROUND ART

Conventionally, liquid crystal display devices have been used as displaying sections of television receiving apparatuses.

Each of these liquid crystal display devices incorporate a backlight device as a light source, and a liquid crystal display panel as an optical shutter. The liquid crystal display panel transmits or blocks light emitted from a light source according to an image to be displayed, so as to display the image.

Meanwhile, there are demands for better use efficiency of the light emitted from the light source, in order to attain a brighter display on the liquid crystal display panel.

In response to such demands, various techniques have been proposed. For example, Patent Literature 1 discloses a technique using a lens film made of two lens films (lens sheets) stacked so that their alignment directions of prisms intersect at right angles to each other.

More specifically, Patent Literature 1 discloses a technique in which, of the two lens films, a lens film provided closer to a liquid crystal display element (the liquid crystal display panel) has its alignment direction of the prism arranged parallel to a transmission axis of a polarizing layer through which light enters the liquid crystal display element.

Patent Literature 1

Japanese Patent Application Publication, Tokukaihei, No. 8-22000 A (Publication Date: Jan. 23, 1996)

SUMMARY OF INVENTION (Costs)

However, the configuration disclosed in Patent Literature 1 easily results in high costs. This is because the configuration requires use of a plurality of prism films (lens film on which prisms are formed; prism sheet) that are relatively expensive.

(Use Efficiency of Light Emitted from Light Source)

Moreover, in the configuration disclosed in Patent Literature 1, since a prism film (lens sheet) provided closer to the liquid crystal display element (liquid crystal display panel) has its alignment direction of the prism (groove direction of the lens sheet) arranged parallel to the transmission axis of the polarizing layer (first polarizing layer) through which the light (light emitted from the backlight) enters the liquid crystal display element, it is difficult to improve the use efficiency of the light emitted from the light source. Why it is difficult is as explained as follows. Light transmitted through the lens film has a larger polarization component in a direction intersecting at right angles with an alignment direction of a prism provided on a light-emitting side than that in a direction parallel thereto. However, with the above configuration, it is difficult for the polarization component in the intersecting direction to transmit through the polarizing layer through which the light enters the liquid crystal display element.

Moreover, since the alignment directions of the prism intersect at right angles with each other, it is difficult to further improve the use efficiency of the light emitted from the light source. This is because the prism films are so disposed to cancel out polarization features of the prism films.

(Brightness in Horizontal Direction)

Particularly in a case where the liquid crystal display device is used in a television receiving apparatus or the like, it is preferable that an observer of the television receiving apparatus can see an image from any direction in a horizontal direction of the television receiving apparatus. However, in the configuration disclosed in Patent Literature 1, the alignment directions of prisms of the two prism films intersect at right angles with each other, whereby the brightness is higher in a normal direction of the television receiving apparatus than the other directions thereof.

The present invention is accomplished in view of the problem, and an object thereof is to realize (i) a liquid crystal display device and (ii) a television receiving apparatus, each of which is further improved in use efficiency of light emitted from a light source while suppressing increase in costs.

In order to attain the object, a liquid crystal display device according to the present invention includes: a liquid crystal panel; two polarizing layers provided so as to sandwich the liquid crystal panel; a light source; a lens layer for condensing light emitted from the light source; and a λ/2 layer, one of the two polarizing layers being disposed closer to the light source being a rear polarizing layer, the lens layer being disposed between the rear polarizing layer and the light source, and the λ/2 layer being disposed between the rear polarizing layer and the lens layer.

A λ/2 layer in the liquid crystal display device of the present invention functions as a half-wave plate. That is to say, the λ/2 layer provides a half-wave phase difference to an incident light.

According to the configuration, even if a transmission axis of a rear polarizing layer is directed in a same direction as valleys provided on the lens layer, the λ/2 layer disposed between the rear polarizing layer and the lens layer twists a polarization direction of the light. Thus, more light thus transmitted through the lens layer can pass through the rear polarizing layer. As a result, it is possible to improve use efficiency of light emitted from the light source.

Further, according to the configuration, the use efficiency of light is improvable with a configuration cheaper than a conventional configuration which uses two prism sheets to improve the use efficiency of light.

The liquid crystal display device of the present invention is preferably configured in such a manner that the lens layer has a plurality of valleys formed thereon in such a manner that each of the valleys runs parallel to each other and crosses the lens layer, and the valleys are formed along a horizontal direction as seen from an observer of the liquid crystal panel.

According to the configuration, the lens layer is capable of converging light in a vertical direction as seen from an observer, by forming the valleys so that the valleys are provided in a horizontal direction as seen from the observer. This thus makes it possible to efficiently utilize the light emitted from the light source.

Moreover, according to the configuration, the lens layer is disposed to mainly converge light in a vertical direction as seen from the observer. This configuration does not cause the brightness to concentrate on a front side, as with the conventional configuration in which two prism sheets are disposed so that their alignment directions of prisms intersect at right angles with each other. Therefore, it is possible to attain a display with high brightness not only when the display is observed from the front of the liquid crystal panel but also when the display is observed from an oblique position on either left or right side of the liquid panel.

The liquid crystal display device of the present invention is preferably configured in such a manner that the each of the valleys formed on the lens layer is directed along a same direction as a transmission axis of the rear polarizing layer.

In this case, a transmission axis of the rear polarizing layer is directed along a horizontal direction of the liquid crystal panel as seen from an observer of the liquid crystal panel.

According to the configuration, by having the valleys and the transmission axis directed along the same direction, most of the light emitted from the light source and transmitted through the lens layer can be passed through the transmission axis of the rear polarizing layer. As a result, it is possible to improve the use efficiency of light.

The liquid crystal display device of the present invention is preferably configured in such a manner that the lens layer is a prism layer.

According to the configuration, it is possible to converge the light emitted from the light source more efficiently to the liquid crystal panel.

The liquid crystal display device of the present invention is preferably configured in such a manner that the lens layer is a lenticular lens layer.

According to the configuration, it is possible to converge the light emitted from the light source more efficiently to the liquid crystal panel.

The liquid crystal display device of the present invention can be configured in such a manner that the rear polarizing layer is disposed so that its transmission axis runs in a horizontal direction as seen from an observer which sights the liquid crystal panel.

The liquid crystal display device of the present invention can be configured in such a manner that the $\lambda/2$ layer has its extending axis at an angle of 45° with respect to a direction of valleys provided on the lens layer.

The liquid crystal display device of the present invention can be configured in such a manner that the $\lambda/2$ layer twists a polarization direction of visible light incident on the $\lambda/2$ layer, by 90 degrees.

By specifying the configuration of the rear polarizing layer and the $\lambda/2$ layer as above, it is possible to further improve the use efficiency of light emitted from the light source.

The liquid crystal display device of the present invention can be configured in such a manner that the $\lambda/2$ layer is disposed in such a manner that a polarization direction of visible light passed through the $\lambda/2$ layer is in a same direction as a transmission axis of the rear polarizing layer.

The liquid crystal display device of the present invention can be configured in such a manner that the $\lambda/2$ layer has a retardation value of not less than 228 nm but not more than 328 nm.

According to the configuration, the $\lambda/2$ layer is optimized for light having a waveform of around 555 nm (i.e., not less than 228 nm but not more than 328 nm) which is a wavelength that humans sense as strong light. Thus, it is possible to enhance an effect of the present invention that the use efficiency of light is improved, thereby allowing humans to see a bright display.

The liquid crystal display device of the present invention is preferably configured in such a manner that the $\lambda/2$ layer has a haze value of not less than 0% but not more than 50%.

A haze value in such a range allows improvement in transmittance of approximately 3% as compared to a case where the haze exceeds 50%.

The liquid crystal display device of the present invention is preferably configured in such a manner that the $\lambda/2$ layer is made from polycarbonate.

According to the configuration, it is possible to form an $\lambda/2$ layer that can be easily handled, at low costs.

The liquid crystal display device of the present invention is preferably configured in such a manner that the two polarization layers are arranged in crossed Nicols.

Generally, a transmission axis of a pair of polarization sunglasses used for blocking reflected light is in a vertical direction with respect to a person thus wearing the sunglasses. Light reflected from an object includes many polarization components in a horizontal direction with respect to an observer, and thus such a configuration allows efficient blocking of the reflected light. Therefore, if the transmission axis of the polarizing layer provided closer to the observer of the two polarizing layers runs in a horizontal direction, the person wearing the polarization sunglasses has difficulty in seeing the display. Therefore, it is desirable that a transmission axis of the polarizing layer provided on a side closer to the observer to be arranged in a vertical direction with respect to the observer.

According to the configuration, the transmission axis of the rear polarizing layer is directed along a horizontal direction, and the two polarizing layers are disposed in crossed Nicols. Thus, the transmission axis of the transmitting layer provided closer to the observer is directed in a vertical direction. Therefore, even if the liquid crystal panel is observed while wearing the polarization sunglasses, it is possible to satisfactorily see an image displayed on the liquid crystal panel.

In order to attain the foregoing object, a television receiving apparatus of the present invention includes: any one of the foregoing liquid crystal display devices; and a tuner section for receiving television broadcast.

Since the television receiving apparatus of the present invention includes the liquid crystal display apparatus of the present invention, the use efficiency of light emitted from the light source is improved, thereby allowing a reduction in electricity consumption. Moreover, the television receiving apparatus can attain a display of high brightness from any direction in a horizontal direction, not just from a front side thereof.

REFERENCE SIGNS LIST 1 liquid crystal display device
10 backlight device (light source)
12 backlight housing
14 fluorescent tube
20 optical sheet assembly
22 lens sheet (lens layer)
24 diffusing plate
26 diffusing sheet
28 groove on lens sheet
30 λ/2 sheet (λ/2 layer)
40 liquid crystal display panel
42 first glass substrate
44 second glass substrate
46 liquid crystal layer
50 first polarizing layer (rear polarizing layer)
52 second polarizing layer
60 television receiving apparatus
62 television tuner circuit board (tuner section)
64 power circuit board
66 control circuit board
68 speaker
70 front housing
72 rear housing
74 housing stand
80 polarization sunglasses
V groove direction on lens sheet
L polarization direction after transmission through lens sheet
R extending direction of λ/2 sheet
T1 transmission axis of first polarizing layer
T2 transmission axis of second polarizing layer
G transmission axis of polarization sunglasses
H horizontal direction
P vertical direction
M observer

DESCRIPTION OF EMBODIMENTS

One embodiment of the present invention is described below with reference to FIGS. 1 through 9.

(Configuration of Liquid Crystal Display Device)

Figure 1:
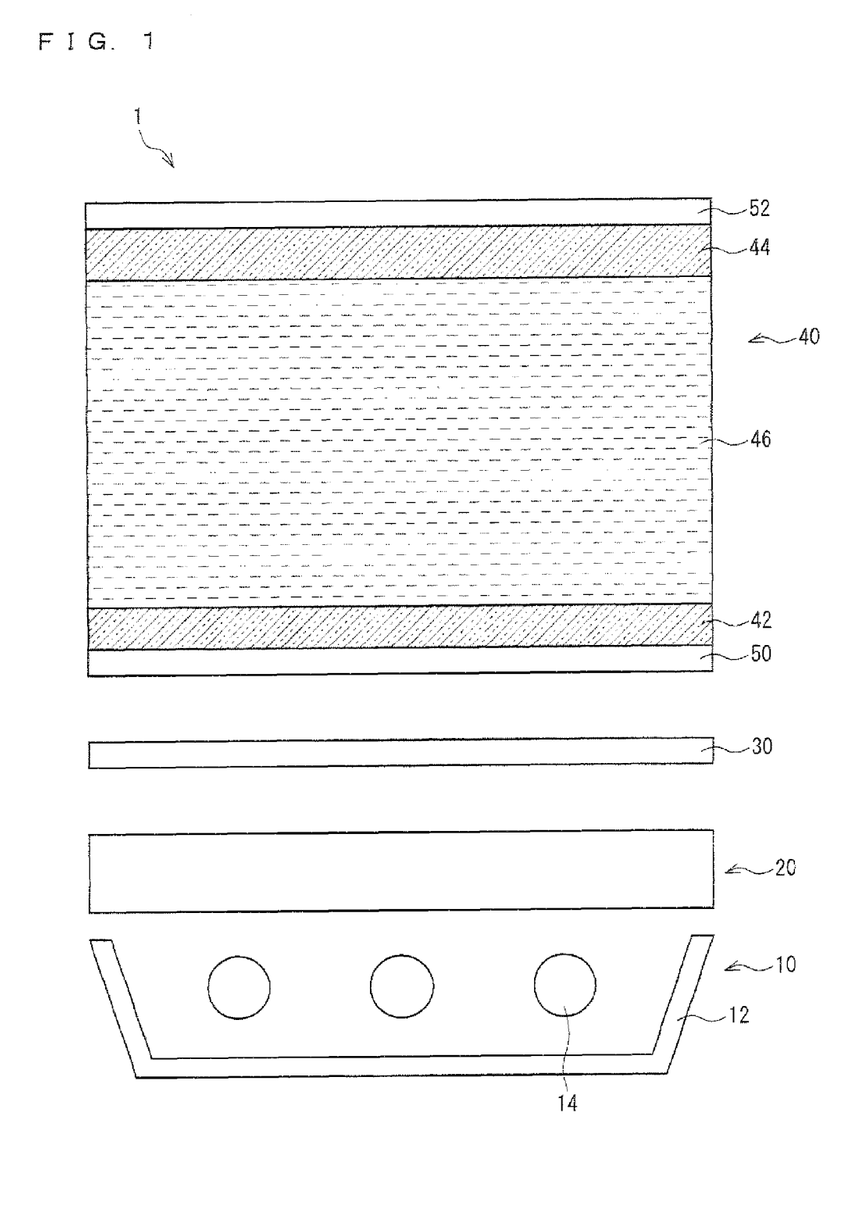
FIG. 1 illustrates an embodiment of the present invention, and is a cross-sectional view illustrating a configuration of a liquid crystal display device.

First described is a configuration of a liquid crystal display device 1, with reference to FIG. 1. FIG. 1 is a cross-sectional view schematically illustrating a configuration of a liquid crystal display device 1. As illustrated in FIG. 1, the liquid crystal display device 1 of the present embodiment includes a backlight device 10, an optical sheet assembly 20, and a liquid crystal display panel 40, provided in this order. Further, a λ/2 sheet 30 is provided between the optical sheet assembly 20 and the liquid crystal display panel 40.

More specifically, the liquid crystal display panel 40 includes a first glass substrate 42 and a second glass substrate 44, and a liquid crystal layer 46 is sandwiched between the first glass substrate 42 and the second glass substrate 44.

On an outer side of the first glass substrate 42, a first polarizing layer 50 (back-side polarizing layer) is attached, and on an outer side of the second glass substrate 44, a second polarizing layer 52 is attached.

The backlight device 10 includes a backlight housing 12 as a frame, and fluorescent tubes 12 as light-emitting sources provided in the backlight housing 12.

(Optical Sheet Assembly)

Figure 2:
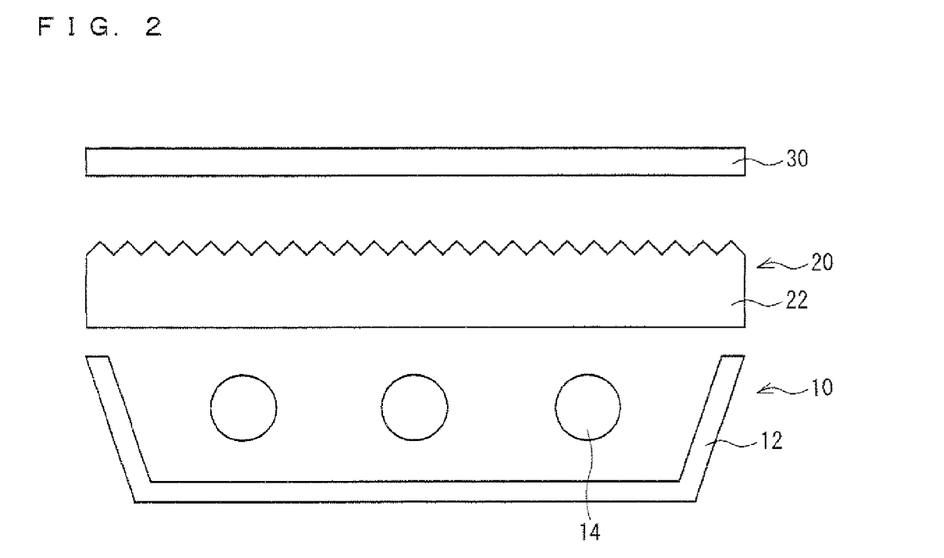
FIG. 2 illustrates an embodiment of the present invention, and is a cross-sectional view illustrating a layer configuration example of an optical sheet assembly.
Figure 3:
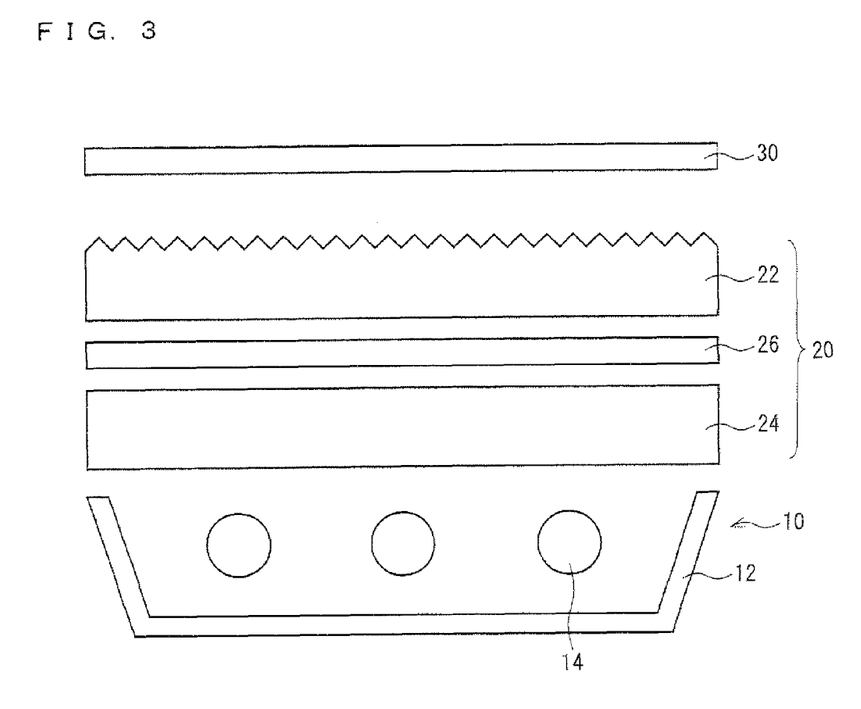
FIG. 3 illustrates an embodiment of the present invention, and is a cross-sectional view illustrating a layer configuration example of the optical sheet assembly.

The following description explains a configuration of the optical sheet assembly 20, with reference to FIGS. 2 and 3 which are cross-sectional views of layer configuration examples of the optical sheet assembly.

The optical sheet assembly 20 includes at least one lens layer, for example one lens sheet 22. As long as the lens layer is included in the optical sheet assembly 20, the layer configuration thereof is not particularly limited. For example, the optical sheet assembly 20 can be configured solely of the lens sheet 22 as the lens layer, as illustrated in FIG. 2.

Moreover, as illustrated in FIG. 3, the optical sheet assembly 20 can be configured of three layers, of a diffusing plate 24, a diffusing sheet 26, and a lens sheet 22 disposed in this order from a side closer to the backlight device. Here, the diffusing plate 24 and the diffusing sheet 26 are used to improve in-plane uniformity of light emitted from the backlight device 10. The diffusing plate 24 generally has a thickness of approximately 1.5 mm to 5 mm.

(Lens Layer)

Figure 4:
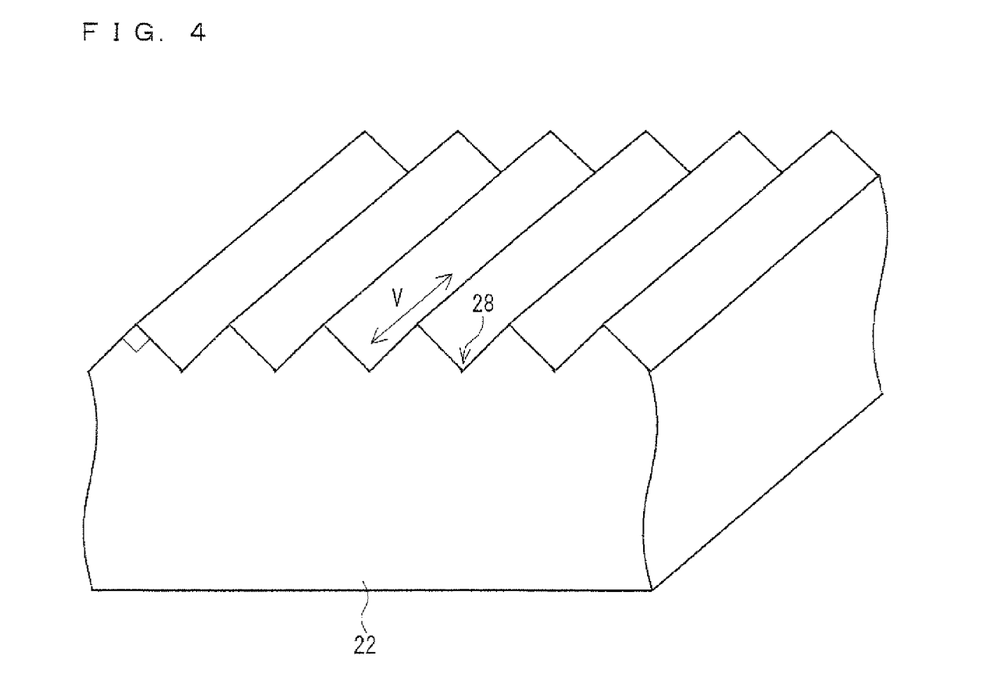
FIG. 4 illustrates an embodiment of the present invention, and is a cross-sectional view illustrating a configuration of a prism sheet.

The following description explains a configuration of the lens layer with reference to FIG. 4. FIG. 4 is a cross-sectional view illustrating a configuration of a prism sheet (prism layer) as one example of the lens sheet 22.

The lens layer here denotes a light-converging layer having a light-converging effect. The lens layer has an effect to concentrate light from a specific direction to a front direction, due to its three-dimensional configuration.

More specifically, the lens sheet 22 can be configured as a prism sheet for example. The prism sheet here denotes a sheet with right-angle-peaked mountains and right-angle-bottomed valleys alternately provided parallel to each other at regular intervals and extending along one direction.

The configuration of the lens sheet 22 is not limited to the foregoing prism sheet configuration, and can be configured in any way as long as it is a sheet with a plurality of valleys provided along one direction in such a manner that the valleys cross the sheet. In other words, the lens sheet 22 can be any sheet as long as an alignment direction of light can be intentionally controlled, and as a result can converge light to the front side of the lens sheet 22.

More specifically, other configuration examples of the prism sheet are, for example, a sheet with mountains and valleys that are not right-angle peaked or bottomed, and a sheet in which the mountains and valleys are of a semicircular shape. Moreover, the lens sheet 22 has a thickness of preferably 100 μm to 500 μm.

As the lens sheet, a lenticular lens sheet (lenticular lens layer) can also be used, other than the prism sheet. A lenticular lens denotes a plate-formed lens array in which a plurality of cylindrical lens of a semicylindrical shape is laid on a flat surface. The use of the lenticular lens sheet as the lens sheet allows converging light emitted from the light source to the liquid crystal panel in a more efficient manner.

(Retardation of λ/2 Layer)

The following description explains the λ/2 layer (λ/2 sheet). The λ/2 layer denotes a layer that is capable of twisting a polarization direction of an incident light by 90°.

More specifically, the λ/2 layer twists by 90° a polarization direction of light within a visible light range, and is particularly preferable to twist a polarization direction of light of 555 nm.

Specifically, in a case where the λ/2 layer is configured by a λ/2 sheet 30, it is preferable to have a retardation of the λ/2 sheet 30 to be 278 nm.

Figure 5:
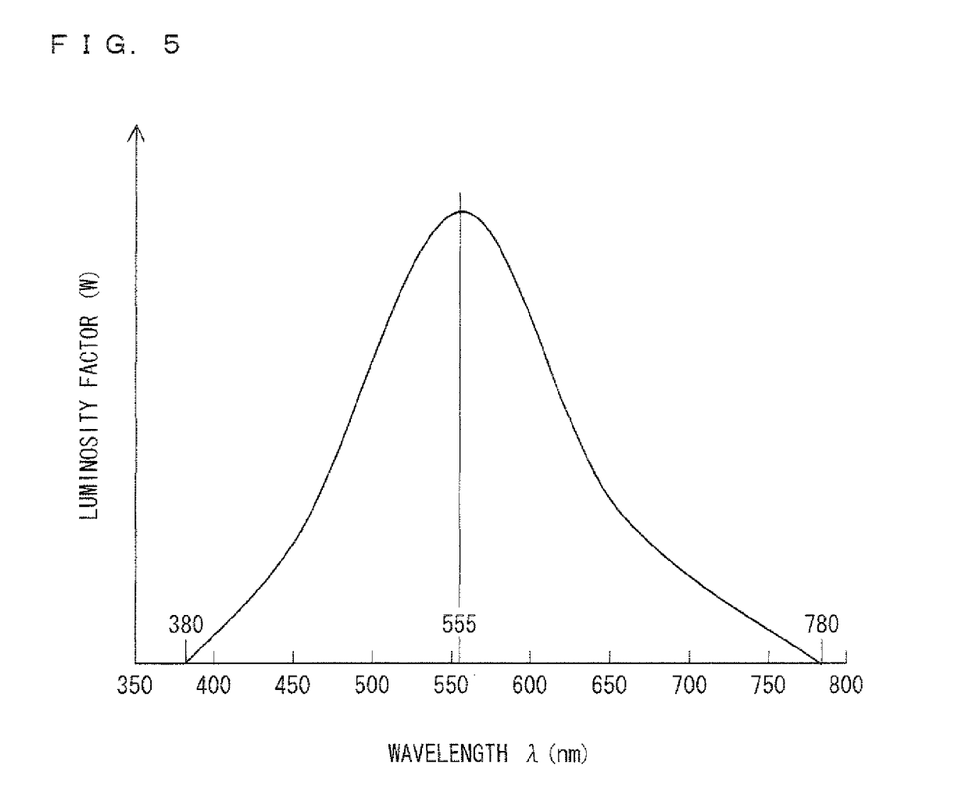
FIG. 5 is an explanatory view illustrating a relationship between a wavelength of a visible light region and a luminosity factor.

In this case, the λ/2 layer is optimized for light of 555 nm which is a wavelength of light that humans sense as the strongest (wavelength in the center of luminosity factor: see FIG. 5). This improves use efficiency of light, thereby enhancing an effect of the present embodiment that humans can see a bright display.

Here, FIG. 5 is an explanatory view showing a luminosity factor (W) of a wavelength in a visible light region (380 nm to 780 nm). The luminosity factor is a degree of how bright a human senses light with a same energy depending on wavelength.

The retardation of the λ/2 layer in the present embodiment is not limited to the foregoing 278 nm. For example, a retardation within a range of 278 nm±50 nm (not less than 228 nm but not more than 328 nm) can also attain the desired effect.

(Material of λ/2 Sheet)

A material used for the λ/2 sheet 30 as the λ/2 layer is not particularly limited, and material such as polycarbonate (PC), triacetyl cellulose (TAC), or cycloolefin-based material can be used for example.

The λ/2 sheet 30 is generally manufactured by extruding and extending the material.

Among the materials, an extruded/extended film made of polycarbonate is preferable due to its ease in handling and cheapness.

Moreover, the triacetyl cellulose is preferable, in terms of integrally providing the λ/2 sheet 30 with the liquid crystal display panel 40, since it is easy to integrally form the λ/2 sheet made of triacetyl cellulose with the first polarizing layer 50.

(Haze of λ/2 Sheet)

The λ/2 sheet 30 is preferable to not have haze in view of enhancing the effect of the present embodiment, in the point that the use efficiency of light is improved, which allows humans to see a bright display.

On the other hand, in view of improvement in display quality of the liquid crystal display device 1, it is also possible to apply a slight amount of haze to the λ/2 sheet 30. In such a case, the haze is preferably not more than 50%. Haze of not more than 50% allows an increase in transmittance of approximately 3% as compared to a case where the haze exceeds 50%.

Further, the haze can be applied in view of preventing damage to the λ/2 sheet 30.

There is the possibility that haze is applied to the λ/2 sheet 30 unintentionally during the manufacturing process thereof, however as long as the haze is not more than 50%, the effect attained of the present embodiment will not be remarkably reduced.

(Disposition of λ/2 Sheet)

In the configuration illustrated in FIG. 1 for example, the λ/2 sheet 30 as the λ/2 layer is provided as a separate sheet to the optical sheet assembly 20 and the liquid crystal display panel 40. However, the configuration of the λ/2 sheet 30 is not limited to such a configuration. For example, as already described, the λ/2 sheet 30 can be configured integrally with for example the first polarizing layer 50, or can be configured as a layer attached to another member by being coated on another member or the like.

Moreover, in the configuration illustrated in FIG. 1, explanation is given for a configuration in which no other layer is provided between the λ/2 sheet 30 and the optical sheet assembly 20, or between the λ/2 sheet 30 and the first polarizing layer 50. However, the configuration is not limited to such a configuration, and for example another layer may be sandwiched therebetween.

(Optical Axis Direction and the Like)

Figure 6:
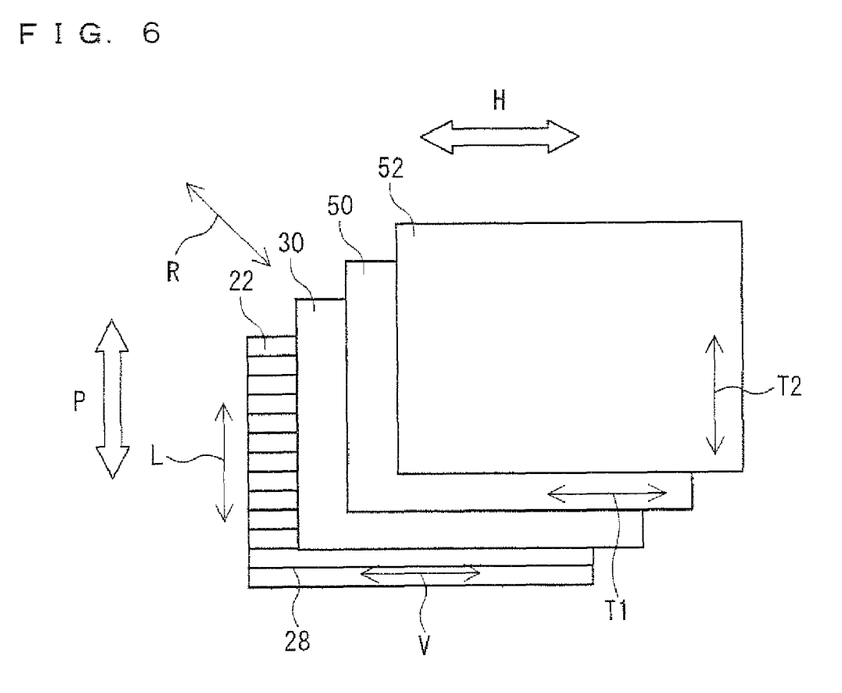
FIG. 6 illustrates an embodiment of the present invention, and is an explanatory view showing optical axis directions and the like of a $\lambda/2$ layer and like layers.
Figure 7:
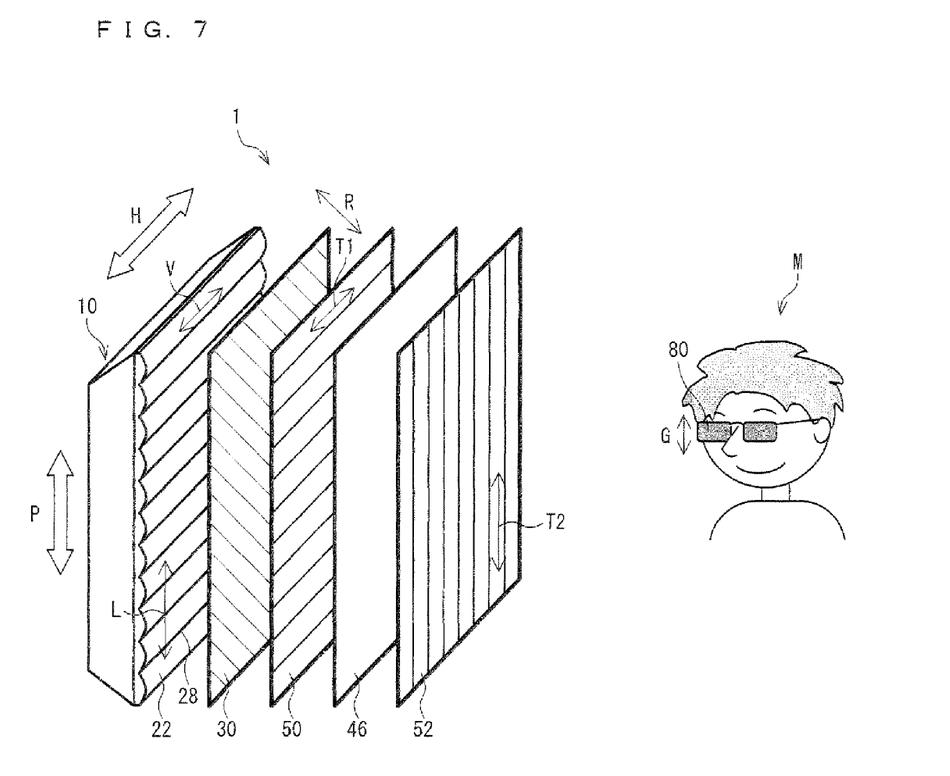
FIG. 7 illustrates an embodiment of the present invention, and is an explanatory view schematically illustrating a state in which an observer is watching a liquid crystal display device.
Figure 8:
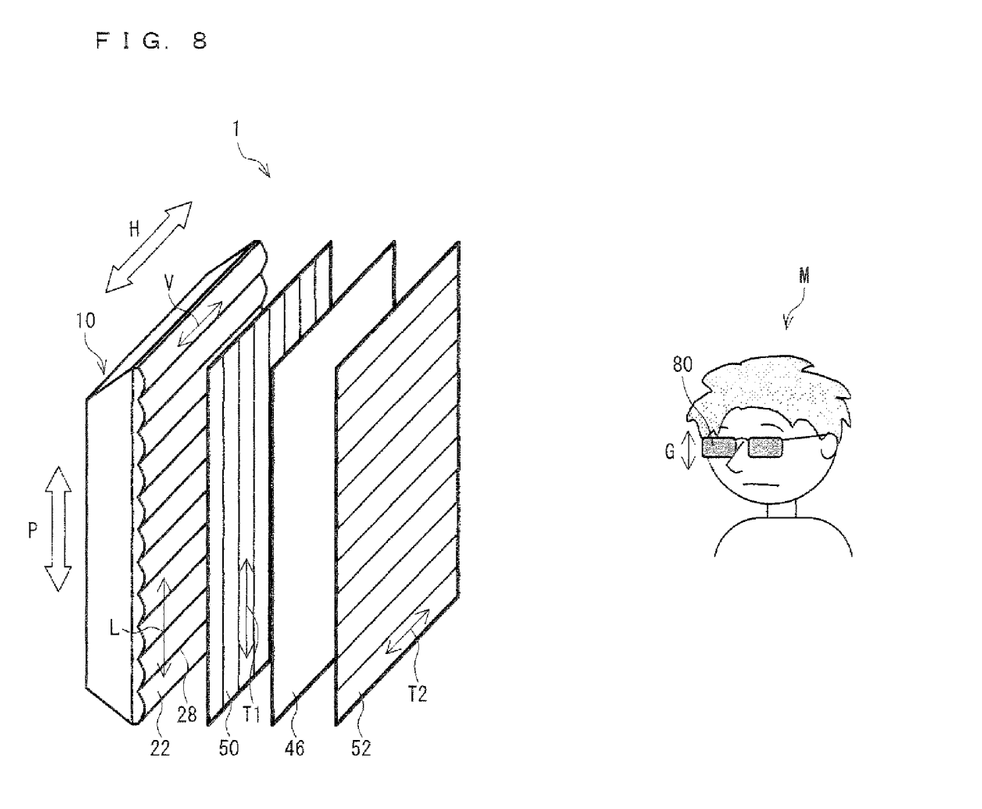
FIG. 8 is a view schematically illustrating a state in which an observer is watching a liquid crystal display device that does not include a λ/2 layer.

The following description deals with the optical sheet assembly 20, the λ/2 layer, and the first polarizing layer 50, regarding directions of their optical axis and the like, with reference to FIGS. 6 through 8.

(Lens Layer)

The first description explains the lens sheet 22 with reference to FIG. 6. FIG. 6 shows directions of optical axis directions and the like of the λ/2 layer and like layers in the present embodiment.

As illustrated in FIG. 6, in the present embodiment, a direction of valleys 28 (arrow V shown in FIG. 6) on the lens sheet 22 is a direction substantially parallel to a horizontal direction (arrow H shown in FIG. 6) in a state in which the liquid crystal display device 1 is placed. In other words, the lens sheet 22 is disposed in such a manner that its valleys 28 become parallel to the horizontal direction H.

The horizontal direction in a state in which the liquid crystal display device 1 is placed can be also said as a horizontal direction as seen from an observer that watches the liquid crystal display device in a normal manner.

(λ/2 layer)

The following description explains the λ/2 sheet 30 as the λ/2 layer. The λ/2 sheet 30 in the present embodiment is disposed in such a manner that its extending direction (extending axis: arrow R shown in FIG. 6) is at an angle of 45° with respect to the direction V of the valleys 28 of the lens sheet 22.

(First Polarizing Layer)

Next is a description of the first polarizing layer 50. The first polarizing layer 50 in accordance with the present embodiment is disposed in such a manner that its transmission axis (arrow T1 shown in FIG. 6) is in a direction parallel to the direction V of the valleys 28 of the lens sheet 22. That is to say, the valleys 28 of the lens sheet 22 and the transmission axis T1 of the first polarizing layer 50 are arranged parallel to each other. Therefore, the transmission axis T1 of the first polarizing layer 50 is at an angle of 45° with respect to the extending axis λ/2 sheet 30. The direction of the transmission axis T1 of the first polarizing layer 50 is parallel to the horizontal direction H.

As described above, the extending direction R of the λ/2 sheet 30 in accordance with the present embodiment is at an angle of substantially 45° with respect to the direction L of the valleys 28 of the lens sheet 22 and the transmission axis T1 of the first polarizing layer 50. In such a case, a phase difference of the λ/2 sheet 30 is preferably 260 nm with respect to the polarization (based on the polarization) in the direction L of the valleys 28 or the direction of the transmission axis T1, as explained earlier.

(Second Polarizing Layer)

The following description explains the second polarizing layer. The second polarizing layer 52 in accordance with the present embodiment is disposed in such a manner that its transmission axis (arrow T2 shown in FIG. 6) intersects at right angles with the transmission axis T1 of the first polarizing layer 50. Namely, the transmission axis T2 of the second polarizing layer 52 is in a direction that intersects with the horizontal direction H at right angles (vertical direction: arrow P shown in FIG. 6).

(Use Efficiency of Light)

The following description explains the use efficiency of light in the foregoing configurations, with reference to FIGS. 7 and 8. FIG. 7 is an explanatory view schematically illustrating a state in which an observer M is watching the liquid crystal display device 1 of the present embodiment. Moreover, FIG. 8 is an explanatory view schematically illustrating a state in which an observer M is watching a liquid crystal display device 1 that has the λ/2 layer (λ/2 sheet 30) taken out from the liquid crystal display device 1 shown in FIG. 7.

(Lens Layer)

With the liquid crystal display device 1, particularly when used in a television receiving apparatus, there is generally a possibility that an observer M watches the television receiving apparatus from any direction within a wide angle range in directions parallel to a placement surface of the television receiving apparatus, i.e., the horizontal direction H.

On the other hand, it is rare that the observer M would watch the television receiving apparatus from a wide range of the vertical direction P.

In other words, it is preferable to ensure sufficient brightness in a wide range in the horizontal direction of the liquid crystal display device 1, however there is no need to ensure such brightness in a wide range in the vertical direction of the liquid crystal display device 1.

Therefore, with the liquid crystal display device 1, it is preferable to converge, to a front direction (normal direction of the display surface) and the horizontal direction (horizontal direction H) of the liquid crystal display device 1, light emitted from the backlight device 10 that spreads in a vertical direction (vertical direction P) of the liquid crystal display device 1, particularly light that spreads in a direction largely oblique to the front direction.

In order to converge the light in the vertical direction P and distribute this light to the horizontal direction H by the lens sheet 22 having a light-converging effect, it is necessary to have the direction V of the valleys 28 of the lens sheet 22 parallel to the horizontal direction H. This allows converging of light in the vertical direction P without converging the light in the horizontal direction H.

In a case where the lens sheet 22 is disposed so that the direction V of its valleys 28 is parallel to the horizontal direction H, the light from the backlight device 10 transmitted through the lens sheet 22 results in including many polarization components in a direction parallel to the vertical direction P. That is to say, the transmitted light has a greater amount of the polarization component in the direction intersecting at right angles with the direction V of the valleys 28 of the lens sheet 22.

This is caused by refraction of the light due to surface unevenness of the lens sheet 22.

(First Polarizing Layer)

In order to effectively use the light transmitted through the lens sheet 22, the transmission axis T1 of the first polarizing layer 50 may be made parallel to a vertical direction P.

FIG. 8 illustrates the foregoing configuration in which a direction V of the valleys 28 of the lens sheet 22 is along the horizontal direction H, and the transmission axis T1 of the first polarizing layer 50 runs along the vertical direction P. In a case where the liquid crystal display panel 40 (omitted in FIG. 8) is a typically used normaly black mode type, the transmission axis T2 of the second polarizing layer 52 becomes parallel to the horizontal direction H. This is because in order to have a normaly black mode, the transmission axes of the two polarizing layers need to intersect at right angles to each other.

(Problem with Polarization Sunglasses)

However, with the configuration of FIG. 8, such a problem occurs that an observer M wearing a pair of polarization sunglasses 80 cannot see the display.

This is because a transmission axis (arrow G shown in FIGS. 7 and 8) of the polarization sunglasses 80 and a transmission axis of the second polarization 52 intersect with each other in many cases. This is described below.

Namely, the transmission axis G of the polarization sunglasses 80 becomes the vertical direction P when the sunglasses 80 are worn. This is because, while the polarization sunglasses 80 functions to suppress difficulty in sight caused by incident light on the eyes which incident light is light reflected from an object, the light reflected from the object includes many of the polarization components in the horizontal direction H.

Light reflected from a snow surface or a sea surface are examples of such light, and such light includes many of the polarization components in the horizontal direction. H. In order to suppress this reflected light to be incident on the eyes, the transmission axis G of the polarization sunglasses 80 is made in a vertical direction P that intersects at right angles with the horizontal direction H.

As a result, the transmission axis T2 of the second polarizing layer 52 and the transmission axis G of the polarization sunglasses 80 intersect at right angles to each other, which therefore causes the display to be difficult to see from the observer M which wears the polarization sunglasses 80.

(λ/2 layer)

As illustrated in FIG. 7, the liquid crystal display device 1 of the present embodiment provides the λ/2 layer between the lens sheet 22 and the first polarizing layer 50. This λ/2 layer causes a polarization direction to rotate by 90°, as previously described.

The following description explains how light is used in a case where the λ/2 layer is used.

As illustrated in FIG. 7, in the liquid crystal display device 1 of the present embodiment also, the direction V of the valleys 28 of the lens sheet 22 is parallel to the horizontal direction H. This is disposed as such to converge and distribute light in the vertical direction to the horizontal directions and the like. As described before, the light transmitted through the lens sheet 22 includes many of the polarization components in a parallel direction to the vertical direction P.

In the configuration of the present embodiment, the light transmitted through the lens sheet 22 is incident on the λ/2 sheet 30, not directly incident on the first polarizing layer 50. The λ/2 sheet 30, as described before, rotates the polarization direction by 90°. Hence, the polarization component immediately after transmitting through the lens sheet 22 which polarization component is in a direction parallel to the vertical direction P changes to a polarization component in a direction parallel to the horizontal direction H, by transmitting through the λ/2 sheet 30.

Next, the light transmitted through the λ/2 sheet 30 is incident on the first polarizing layer 50. In order to efficiently use the light at this time, the transmission axis T1 of the first polarizing layer 50 may be made parallel to the horizontal direction H.

Further, as described with reference to FIG. 8, in a case where the liquid crystal display panel 40 (omitted in FIG. 7) is of a normaly black mode type, the transmission axis T2 of the second polarizing layer 52 is made parallel to the vertical direction P.

As a result, even if the observer M watches the liquid crystal display device 1 while wearing a typical pair of polarization sunglasses 80 that has a transmission axis G in a vertical direction P, the observer M can see the display. This is because (i) the transmission axis T2 of the second polarizing layer 52 provided on the side from which light is emitted of the liquid crystal display device 1 and (ii) the transmission axis G of the polarization sunglasses 80 are parallel to each other.

As described above, the liquid crystal display device 1 of the present embodiment includes a first polarizing layer disposed on a rear side (side closer to the backlight device 10) of the liquid crystal display panel 40, and a $\lambda/2$ sheet 30 disposed between the optical sheet part 20. The valleys 28 are provided on the lens sheet 22 substantially parallel to a horizontal direction (arrow H shown in FIG. 6) in a state in which the liquid crystal display device 1 is placed, and the transmission axis of the first polarizing layer is directed in a same direction as the valleys 28.

According to the configuration, the lens sheet 22 can converge the light in a perpendicular direction (arrow P shown in FIG. 6) with respect to a viewpoint of the observer. Thus, it is possible to efficiently use the light emitted from the backlight device 10.

Moreover, with such a configuration, the lens sheet 22 is capable of converging the light in a vertical direction as seen from the observer to the front side of the liquid crystal panel, however is not capable of converging the light in a horizontal direction as seen from the observer (arrow H shown in FIG. 6) to the front side of the liquid crystal panel. Therefore, the brightness does not concentrate at the front as in the conventional arrangement in which two prism sheets are disposed in such a manner that alignment directions of the prisms intersect at right angles with each other. Thus, a bright display is attainable for not just when the liquid crystal panel is seen from the front, but also when the liquid crystal panel is seen from oblique positions on the left or right side thereof.

As such, the liquid crystal display device 1 of the present embodiment is capable of providing a display with high brightness to an observer in any direction in a horizontal direction of the device, by efficiently using the light emitted from the backlight device. Moreover, as compared to the conventional configuration in which a plurality of prism sheets is used, the use efficiency of the light emitted from the light source is improvable while avoiding an increase in costs. With the liquid crystal display device 1, a transmittance is improved by 10% to 15% than that of the conventional liquid crystal display device, even if they use an identical backlight.

(Television Receiving Apparatus)

Figure 9:
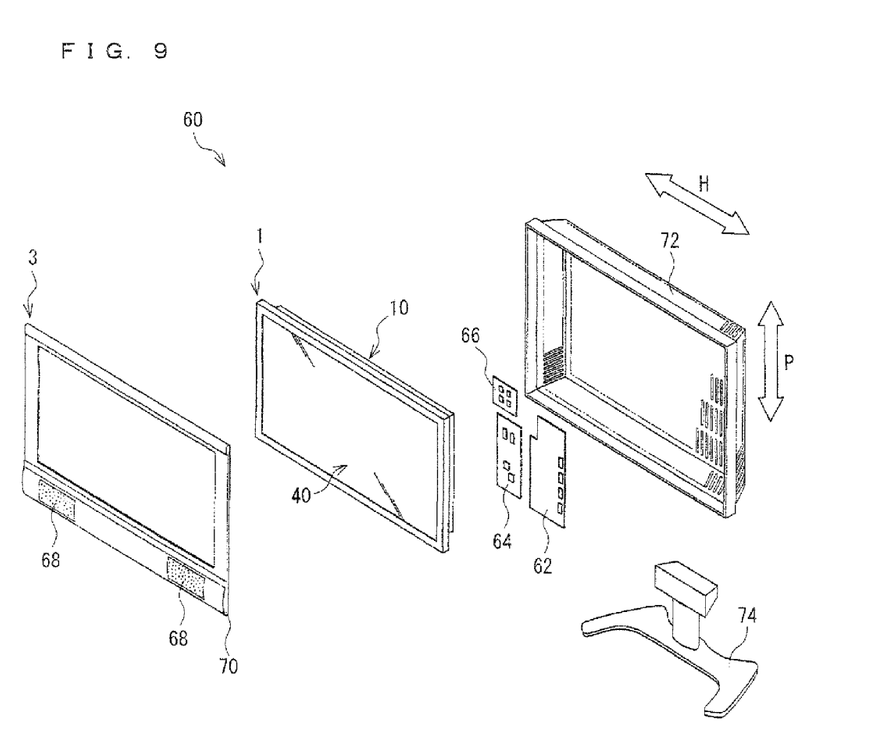
FIG. 9 illustrates an embodiment of the present invention, and is an explanatory view schematically illustrating a configuration of a television receiving apparatus.

The following description explains how the liquid crystal display device 1 of the present embodiment is used as a display section of a television receiving apparatus 60, with reference to FIG. 9. FIG. 9 schematically illustrates a configuration of a television receiving apparatus.

As illustrated in FIG. 9, the television receiving apparatus 60 includes the foregoing liquid crystal display device 1, and this liquid crystal display device 1 is sandwiched between a front housing 70 and a rear housing 72.

In addition to the liquid crystal display device 1, the front housing 70 and rear housing 72 sandwich various components required for functioning as the television receiving apparatus 60. Examples of these components include a television tuner circuit board (tuner section) 62, a power circuit board 64, and a control circuit board 66, as shown in FIG. 9. Moreover, the front housing 70 has speakers 68.

Furthermore, the television receiving apparatus 60 has a stand 74 for placing the television receiving apparatus 60 on a placement surface.

Furthermore, the television receiving apparatus 60 is generally disposed on a horizontal surface. Thus, the direction shown by arrow H in FIG. 9 is the horizontal surface.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

As described above, a liquid crystal display device according to the present invention includes: a liquid crystal panel; two polarizing layers provided so as to sandwich the liquid crystal panel; a light source; a lens layer for converging light emitted from the light source; and a $\lambda/2$ layer, one of the two polarizing layers being disposed close to the light source being a rear polarizing layer, the lens layer being disposed between the rear polarizing layer and the light source, and the $\lambda/2$ layer being disposed between the rear polarizing layer and the lens layer.

Therefore, according to the configuration, use efficiency of light is improved with a configuration cheaper than a conventional configuration using a plurality of prism sheets to enhance use efficiency of light.

In order to attain the object, a television receiving apparatus of the present invention includes: any one of the foregoing liquid crystal display devices; and a tuner section for receiving television broadcast.

Since a television receiving apparatus of the present invention includes the liquid crystal display device of the present invention, use efficiency of light from the light source can be improved, thereby reducing electricity consumption. Moreover, the television receiving apparatus of the present invention can accomplish a display with high brightness to any direction in a horizontal direction, not just from the front side thereof.

INDUSTRIAL APPLICABILITY

A liquid crystal display device of the present invention has a high use efficiency of light, and allows an observer to watch it even through a pair of polarization sunglasses. Therefore, the present invention is suitably usable for purposes such as outdoor purposes, in which a brighter display is required while a liquid crystal display device is often seen through a pair of polarization sunglasses.

The invention claimed is:

1. A liquid crystal display device comprising:
a liquid crystal panel;
two polarizing layers provided so as to sandwich the liquid crystal panel;
a light source;
a lens layer for converging light emitted from the light source; and
a $\lambda/2$ layer,
one of the two polarizing layers being disposed closer to the light source being a rear polarizing layer,
the lens layer being disposed between the rear polarizing layer and the light source,
the $\lambda/2$ layer being disposed between the rear polarizing layer and the lens layer;
wherein a transmission axis of the polarizing layer closest to a viewer is aligned in a vertical direction;
wherein the light source is provided behind the lens layer;
wherein the lens layer has a plurality of valleys formed thereon in such a manner that each of the valleys runs parallel to each other and crosses the lens layer, and wherein the valleys are formed along a horizontal direction as seen from an observer of the liquid crystal panel.

2. The liquid crystal display device according to claim 1, wherein: each of the valleys formed on the lens layer is directed along a same direction as a transmission axis of the rear polarizing layer.

3. The liquid crystal display device according to claim 2, wherein the two polarization layers are arranged in crossed Nicols.

4. The liquid crystal display device according to claim 1, wherein the lens layer is a prism layer.

5. The liquid crystal display device according to claim 1, wherein the lens layer is a lenticular lens layer.

6. The liquid crystal display device according to claim 1, wherein the rear polarizing layer is disposed so that its transmission axis runs in a horizontal direction as seen from an observer which sights the liquid crystal panel.

7. The liquid crystal display device according to claim 1, wherein the λ/2 layer has its extending axis at an angle of 45° with respect to a direction of valleys provided on the lens layer.

8. The liquid crystal display device according to claim 1, wherein the λ/2 layer twists a polarization direction of visible light incident on the λ/2 layer, by 90 degrees.

9. The liquid crystal display device according to claim 1, wherein the λ/2 layer is disposed in such a manner that a polarization direction of visible light passed through the λ/2 layer is in a same direction as a transmission axis of the rear polarizing layer.

10. The liquid crystal display device according to claim 1, wherein the λ/2 layer has a retardation value of not less than 228 nm but not more than 328 nm.

11. The liquid crystal display device according to claim 1, wherein the λ/2 layer has a haze value of not less than 0% but not more than 50%.

12. The liquid crystal display device according to claim 11, wherein the λ/2 layer is made from polycarbonate.

13. A television receiving apparatus comprising:
a liquid crystal display device as set forth in claim 1; and
a tuner section for receiving television broadcast.

* * * * *